(12) United States Patent
Saldivar et al.

(10) Patent No.: US 9,903,482 B2
(45) Date of Patent: *Feb. 27, 2018

(54) BALL VALVE STEM RETAINING SYSTEM

(71) Applicant: Cameron International Corporation, Houston, TX (US)

(72) Inventors: John M. Saldivar, Richmond, TX (US); Paul M. Gutmann, Louisville, NC (US)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,854

(22) Filed: Aug. 10, 2015

(65) Prior Publication Data

US 2016/0069460 A1    Mar. 10, 2016

Related U.S. Application Data

(63) Continuation of application No. 13/673,959, filed on Nov. 9, 2012, now Pat. No. 9,103,449, which is a continuation-in-part of application No. 12/553,037, filed on Sep. 2, 2009, now Pat. No. 8,308,131.

(51) Int. Cl.
| | |
|---|---|
| *F16K 5/06* | (2006.01) |
| *B23P 15/00* | (2006.01) |
| *F16K 27/06* | (2006.01) |
| *F16K 31/50* | (2006.01) |

(52) U.S. Cl.
CPC .......... *F16K 5/0647* (2013.01); *B23P 15/001* (2013.01); *F16K 5/0626* (2013.01); *F16K 5/0694* (2013.01); *F16K 27/067* (2013.01); *F16K 31/50* (2013.01); *Y10T 137/0508* (2015.04)

(58) Field of Classification Search
CPC .... F16K 27/067; F16K 5/0605; F16K 5/0647; F16K 5/0626; F16K 5/0694
USPC ...... 137/315.17, 315.18; 251/315.01–315.16
See application file for complete search history.

(56) References Cited

U.S. PATENT DOCUMENTS

| | | | |
|---|---|---|---|
| 2,585,658 A | 2/1952 | George | |
| 3,172,192 A | 3/1965 | Dresden | |
| 3,269,692 A | 8/1966 | Shafer | |
| 3,501,128 A | 3/1970 | Eldert | |
| 3,589,674 A | 6/1971 | Jones | |
| 3,737,145 A | 6/1973 | Heller | |
| 3,985,334 A * | 10/1976 | Domyan | F16K 5/0642 137/315.19 |

(Continued)

FOREIGN PATENT DOCUMENTS

| | | |
|---|---|---|
| DE | 2161238 | 6/1973 |
| DE | 8435773 | 5/1986 |

(Continued)

*Primary Examiner* — Matthew W Jellett
(74) *Attorney, Agent, or Firm* — Fletcher Yoder, P.C.

(57) ABSTRACT

A system includes a ball valve with a housing having a fluid passage, a ball disposed within the housing along the fluid passage, and a stem coupled to the ball. The stem is configured to move the ball between an open position and a closed position relative to the fluid passage. The stem is disposed in a first opening on a first side of the housing. The stem is removable from the first opening, through at least one opening in the ball, and out through a second opening on a second side of the housing.

32 Claims, 12 Drawing Sheets

(56) References Cited

U.S. PATENT DOCUMENTS

| | | | |
|---|---|---|---|
| 4,180,244 A | | 12/1979 | Rosenitsch |
| 4,326,697 A | | 4/1982 | Autage et al. |
| 4,519,412 A | | 5/1985 | Grazioli |
| 4,570,659 A | * | 2/1986 | Karr, Jr. ................ F16K 17/383 |
| | | | 137/72 |
| 5,152,501 A | | 10/1992 | Raymond, Jr. |
| 5,323,805 A | * | 6/1994 | Scaramucci ............ F16K 35/06 |
| | | | 137/382 |
| 5,868,378 A | | 2/1999 | McMahon |
| 6,202,668 B1 | | 3/2001 | Maki |
| 6,669,171 B1 | | 12/2003 | Stunkard |
| 6,874,757 B2 | | 4/2005 | Hallett |
| 6,988,709 B2 | * | 1/2006 | Scaramucci .......... F16K 5/0626 |
| | | | 137/315.18 |
| 7,347,408 B2 | | 3/2008 | Keiser |
| 9,103,449 B2 | * | 8/2015 | Saldivar ................ F16K 5/0626 |

FOREIGN PATENT DOCUMENTS

| | | |
|---|---|---|
| GB | 691216 | 5/1935 |
| WO | 01/84028 | 11/2001 |

\* cited by examiner

BALL VALVE STEM RETAINING SYSTEM

CROSS REFERENCE TO RELATED APPLICATIONS

This application is a continuation of U.S. patent application Ser. No. 13/673,959 entitled "Ball Valve Stem Retaining System", filed on Nov. 9, 2012, which is herein incorporated by reference in its entirety, which is a continuation in part of U.S. patent application Ser. No. 12/553,037, entitled "Ball Valve Stem Retaining System", filed Sep. 2, 2009, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves may be employed to regulate a flow of fluid in a variety of applications. Ball valves typically include a body, a ball disposed within the body, and a stem rotationally coupled to the ball. During ball valve maintenance, the stem may be removed to service various components within the ball valve, such as bushings, bearings and seals. Unfortunately, certain ball valves may need to be disassembled prior to removal of the stem. Due to the large number of fasteners typically employed within a ball valve, such disassembly may be both expensive and time-consuming. Consequently, maintenance operations may be performed at longer than desired intervals, resulting in inefficient valve operation.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
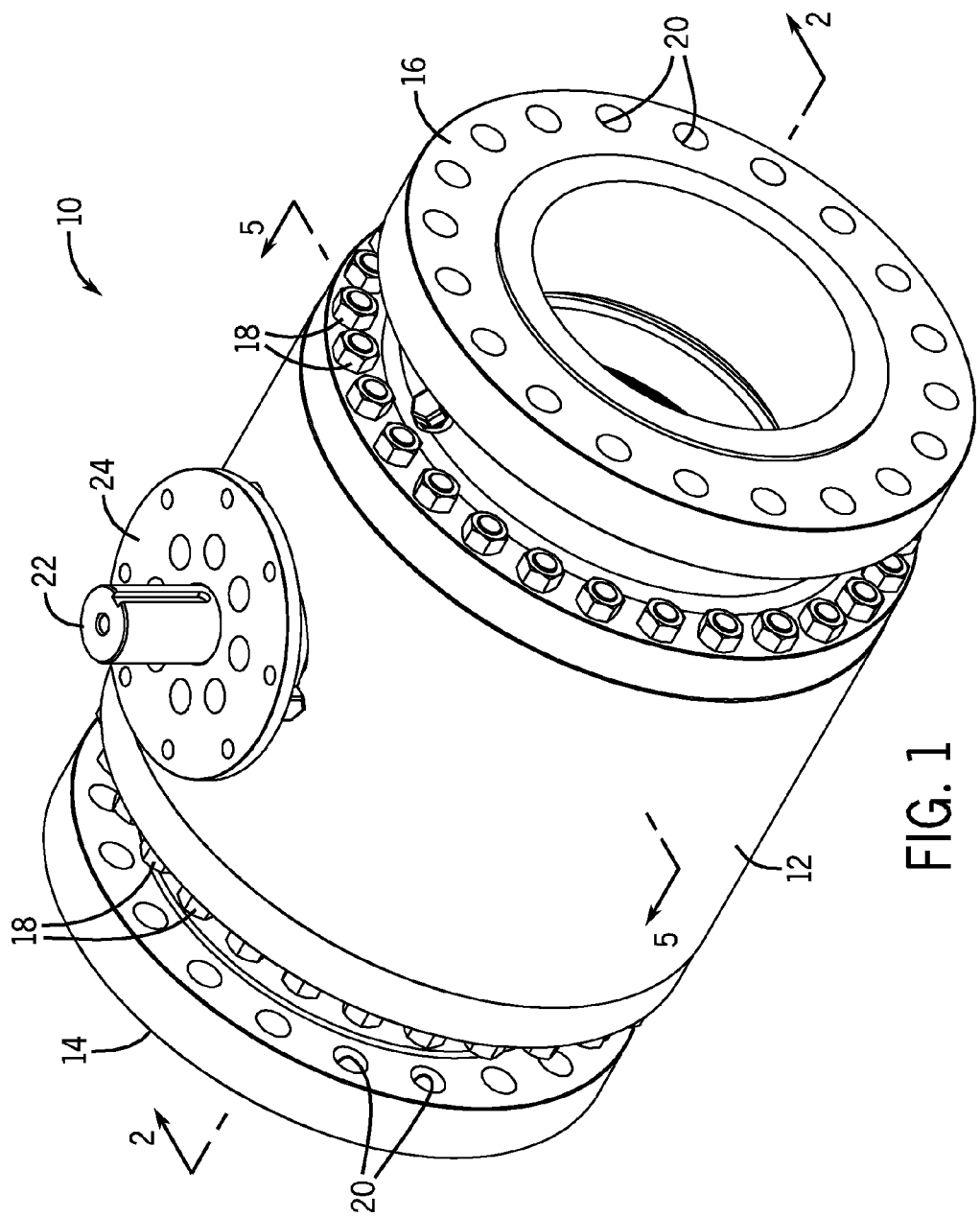
FIG. 1 is a perspective view of a ball valve having an internally retained stem configured to be removed without separating closures from the body in accordance with certain embodiments of the present technique.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure may significantly reduce the duration and costs associated with ball valve maintenance operations by providing an internally retained stem that may be removed from the valve without uncoupling the closures. As will be appreciated, ball valves may include stems that are internally or externally retained. Externally retained stems include certain features external to the valve body configured to restrict movement of the stem away from the ball during operation. For example, certain externally retained stems include a ridge disposed about the circumference of the stem. Movement of the stem away from the ball is blocked by contact between the ridge and a plate bolted to the body. To extract the stem for maintenance, the plate may be unbolted and removed. Unfortunately, ball valves including externally retained stems are expensive to manufacture due to the additional parts associated with retaining the stem and configuring the valve body to accommodate the stem retention plate. Additionally, during disassembly and repair operations, residual fluid pressure within the valve may cause the stem to be ejected from the valve at high speed when the plate is unbolted and removed.

Alternatively, ball valves may include internally retained stems. In such valves, the stem may include a ridge disposed about the circumference of the stem, similar to the externally retained stems. However, movement of the stem away from the ball is blocked by contact between the ridge and an inner surface of the valve body. In this configuration, the stem may not be removed by extracting the stem in a direction away from the valve. Instead, the stem may be removed by translating the stem into the body. Unfortunately, because the ball is disposed within the body, the ball must be removed prior to extracting the stem. The process of removing the ball generally involves uncoupling at least one closure, each closure being disposed to opposite longitudinal ends of the body. Due to the large number of fasteners that secure the closures to the body, this process may be time-consuming and expensive.

Consequently, the disclosed embodiments include an internally retained stem configured to pass through at least one opening within the ball. In this manner, the stem may be removed from the valve without uncoupling the closures from the body. Specifically, certain embodiments include a stem having a retainer disposed about a circumference of the stem. The retainer is configured to block inward movement of the stem via contact between the retainer and an outer surface of the body. Upon removal of the retainer, the stem may be either removed through the ball and a fluid passage of the valve, or the stem may be removed through an opposite side of the valve (i.e., in a crosswise direction relative to the fluid passage). In either configuration, the duration and costs associated with ball valve maintenance are substantially reduced, because the closures may remain coupled to the body.

FIG. 1 is a perspective view of a ball valve 10 configured to regulate a flow of fluid. As illustrated, the ball valve 10 includes a body 12 (e.g., hollow cylindrical body), a first closure 14 and a second closure 16. The closures 14 and 16 are configured to seal the body 12 and secure the valve 10 to fluid conduits. The closures 14 and 16 are coupled to the body 12 by multiple fasteners 18. In the present configuration, each fastener 18 includes a threaded rod (e.g., bolt) disposed within a complementary threaded recess within the body 12. The threaded rods pass through openings within the closures 14 and 16, and are secured by nuts. The nuts serve to securely fasten the closures 14 and 16 to the body 12. As will be appreciated, the number of fasteners 18 may be selected to provide a proper seal between the closures 14 and 16 and the body 12. Specifically, the fasteners 18 are configured to substantially reduce the formation of gaps between the closures 14 and 16 and the body 12 that may cause fluid to leak from the valve 10. For example, in certain embodiments, each closure 14 and 16 may be coupled to the body 12 by more than 3, 5, 10, 15, 20, 25, 30, 35, 40, 45, 50, or more fasteners 18. In an alternative embodiment, the closures 14 and 16 are secured to the body 12 by a welded connection. In such an embodiment, the fasteners 18 may be omitted.

Each closure 14 and 16 includes multiple openings 20 configured to couple each closure 14 and 16 to a fluid conduit. As will be appreciated, fasteners may pass through the openings 20 and corresponding openings within respective conduits to secure the closures 14 and 16 to the conduits. The number of openings may be selected to substantially reduce the possibility of fluid leakage between the closures 14 and 16 and the conduits. For example, the closures 14 and 16 may include more than 3, 5, 10, 15, 20, 25, 30, 35, 40, 45, 50, or more openings 20.

As discussed in detail below, the valve 10 includes a ball configured to rotate from an open position to a closed position. The ball includes a bore that facilitates the passage of fluid through the valve 10. In the open position, the bore of the ball is aligned with a bore of each closure 14 and 16 such that fluid may pass through the valve 10. In the closed positioned, the bore is rotated perpendicular to the closures 14 and 16, thereby substantially blocking the passage of fluid through the valve 10. As will be appreciated, rotating the ball to an orientation between the open and closed positions may establish a desired flow rate of fluid through the valve 10 by adjusting the fluid passage area. The ball is rotationally coupled to a stem 22 such that rotation of the stem 22 causes the ball to rotate. Furthermore, the stem 22 is coupled to an adapter plate 24 configured to mount with a variety of valve control components. For example, the adapter plate 24 may be mounted to an electric or hydraulic actuator configured to remotely control the position of the ball within the valve 10. Alternatively, the adapter plate 24 or stem 22 may be coupled to a handle such that the valve 10 may be operated manually.

As discussed in detail below, the stem 22 is configured to be removed from the valve 10 without uncoupling the closures 14 and/or 16 from the body 12. Due to the large number of fasteners 18 that couple the closures 14 and 16 to the body 12, the process of removing the closures 14 and 16 may be time-consuming. Consequently, the stem 22 of the present embodiment may be removed from the valve 10 without uncoupling the fasteners 18. Specifically, the stem 22 may be retained by a removable retainer configured to block inward movement of the stem 22. Once the retainer has been removed, the stem 22 may pass through the body 12 and enter the ball. Because the length of the stem 22 is limited with respect to an inner diameter of the ball, the stem 22 may be removed through either closure 14 or 16. For example, the length of the stem 22 may be less than the inner ball diameter. Alternatively, the length of the stem 22 may be limited such that it may enter the ball at an angle (i.e., canted orientation). This removal process may significantly reduce the time associated with stem removal, thereby significantly reducing the cost of maintenance operations.

Figure 2:
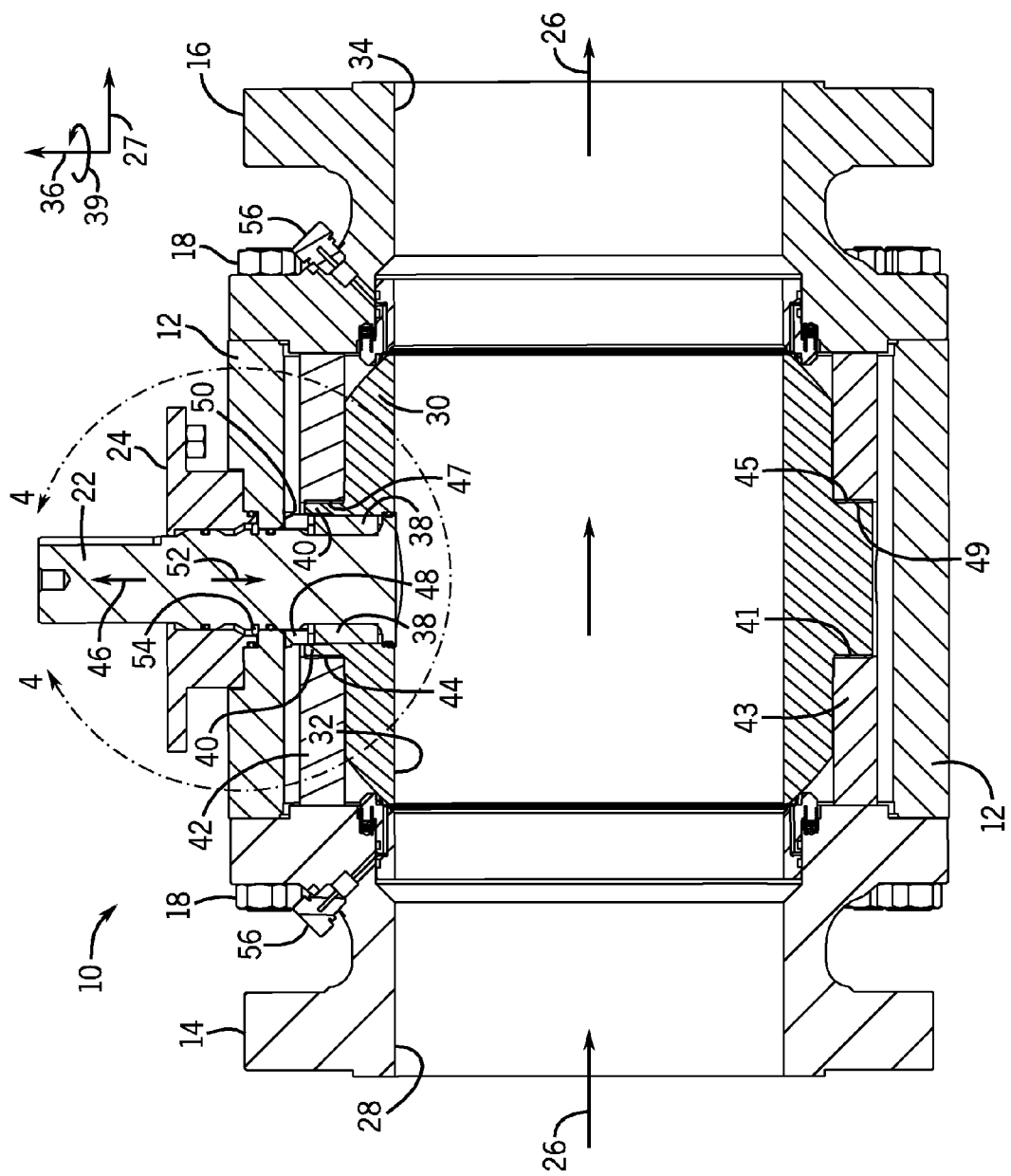
FIG. 2 is a cross-section of an exemplary ball valve, taken along line 2-2 of FIG. 1, in accordance with certain embodiments of the present technique.

FIG. 2 is a cross-section of an exemplary ball valve 10, taken along line 2-2 of FIG. 1. As illustrated, the valve 10 is in the open position, thereby facilitating a flow of fluid 26 in an axial direction 27. Specifically, the fluid enters a bore 28 of the first closure 14, flows through a bore 32 of a ball 30, and exits a bore 34 of the second closure 16. As previously discussed, the ball 30 may rotate about a radial axis 36 to regulate the flow of fluid 26 through the valve 10. Rotating the ball 30 varies the flow area between the bore 32 and the closures 14 and 16, thereby adjusting the flow rate of fluid 26. To facilitate rotation of the ball 30, the stem 22 is rotationally coupled to the ball 30 by dowels 38. While two dowels 38 are illustrated in the present embodiment, it should be appreciated that more or fewer dowels 38 may be employed in alternative embodiments. For example, certain embodiments may include 1, 2, 3, 4, 5, 6, 7, 8, or more dowels 38 disposed about the stem 22 in a circumferential direction 39. In an alternative embodiment, the stem 22 may be rotationally coupled to the ball 30 by a spline connection.

The ball 30 includes a first trunnion 40 that extends in the radial direction 36. The first trunnion 40 is configured to mount within a first trunnion block 42. Similarly, the ball 30 includes a second trunnion 41 disposed within a second trunnion block 43. The trunnion blocks 42 and 43 serve to orient the ball 30 within the body 12. As discussed in detail below, the trunnion blocks 42 and 43 are secured to the body 12 and include openings 47 and 49 configured to receive the first trunnion 40 and second trunnion 41, respectively. Specifically, the trunnions 40 and 41 have circular cross-sections configured to mount within circular openings 47 and 49 within the trunnion blocks 42 and 43. Because the trunnion blocks 42 and 43 are secured to the body 12, the ball 30 may rotate within the trunnions 40 and 41 when driven to rotate by the stem 22. To facilitate rotation, a first trunnion bearing 44 is disposed between the first trunnion 40 and the opening 47 within the first trunnion block 42, and a second trunnion bearing 45 is disposed between the second trunnion 41 and the opening 49 within the second trunnion block 43. As will be appreciated, the bearings 44 and 45 may reduce rotational resistance of the ball 30.

During operation of the valve 10, the stem 22 is retained such that movement along the radial direction 36 is blocked. Specifically, movement of the stem 22 along an outward radial direction 46 away from the ball 30 is blocked by contact between the stem 22 and the body 12. In other words, the stem 22 is internally retained by the body 12. As will be appreciated, fluid pressure within the ball 30 may exert a force on the stem 22 in the direction 46. For example, the fluid pressure may be approximately between 0 to 15,000, 0 to 5625, 0 to 3750, 0 to 2000, or about 0 to 290 psi. In certain embodiments, the area of the stem 22 exposed to the fluid within the ball 30 may be approximately between 0.5 to 4, 1 to 3, or about 2 square inches. Therefore, if the pressure within the ball 30 is approximately 4000 psi and the area of the stem 22 is approximately 2 square inches, the fluid may exert a force of approximately 8000 pounds on the stem 22 in the direction 46. Consequently, the present embodiment includes a thrust bushing 48 and thrust washer 50 to facilitate rotation of the stem 22 relative to the body 12 despite the large contact force between the stem 22 and the body 12. As discussed in detail below, the thrust bushing 48 and thrust washer 50 are disposed about the circumference of the stem 22 between a raised portion (not shown) of the stem 22 and the body 12.

Furthermore, the stem 22 is retained along an inward radial direction 52 by a retainer 54 (e.g., c-shaped retainer). As discussed in detail below, the retainer 54 is disposed within a recess (e.g., annular groove) of the stem 22, and contacts an outer surface of the body 12, thereby blocking movement of the stem 22 in the inward radial direction 52. As will be appreciated, other retention configurations, such as snap-type rings or fixed collars, among others, may be employed in alternative configurations. In further embodiments, the stem 22 may be retained by contact between one or more seals disposed between the stem 22 and body 12. During maintenance operations, the adapter plate 24 may first be removed from the valve 10, thereby exposing the retainer 54. Because the stem 22 is internally retained, the stem 22 may remain secured within the valve 10 despite removal of the adapter plate 24. The retainer 54 may then be removed to enable the stem 22 to move in the direction 52. Once the stem 22 is entirely within the bore 32 of the ball 30, the stem 22 may be extracted from the valve 10 through the first closure 14 or the second closure 16. In this manner, the stem 22 may be removed from the valve 10 without removal of the ball 30, the first closure 14, or the second closure 16. As previously discussed, because removing the closures 14 and/or 16 may involve uncoupling a large number of fasteners 18, the present embodiment may reduce the duration of maintenance operations compared to configurations in which the closures 14 and/or 16 are removed to facilitate extraction of the stem 22. Furthermore, as illustrated, the valve 10 includes grease injection ports 56 disposed within each closure 14 and 16 to provide lubricating grease to various components within the valve 10.

Figure 3:
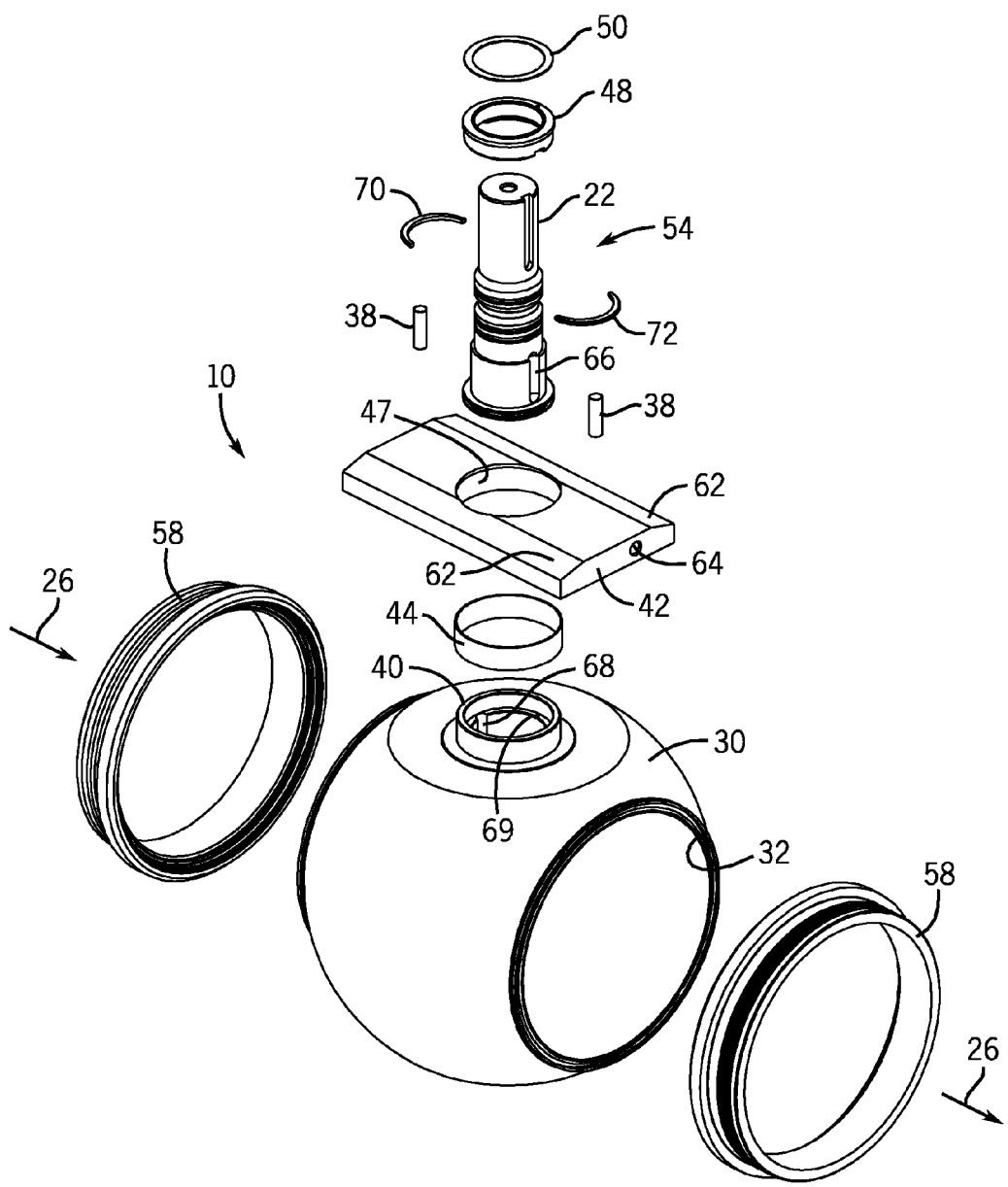
FIG. 3 is an exploded view of internal components within an exemplary ball valve, as shown in FIG. 1, in accordance with certain embodiments of the present technique.

FIG. 3 is an exploded view of internal components within an exemplary ball valve 10, as shown in FIG. 1. As illustrated, the ball 30 is oriented in an open position such that fluid 26 may flow through the bore 32. In the present embodiment, a seat 58 (e.g., annular seal) is disposed on each end of the bore 32 to provide a seal between the ball 30 and the closures 14 and 16. Specifically, in the open position, the seats 58 provide a seal between the bore 32 and the bores 28 and 34 of the closures 14 and 16, respectively. Conversely, in the closed position, the seats 58 provide a seal between the ball 30 and the bores 28 and 34 of the closures 14 and 16, respectively. This configuration may substantially reduce or eliminate fluid leakage within the valve 10.

As previously discussed, the trunnion bearing 44 is disposed about the trunnion 40 to facilitate rotation of the ball 30 within the body 12. As illustrated, the trunnion bearing 44 is disposed between the trunnion 40 and the opening 47 within the trunnion block 42. As will be appreciated, the outer diameter of the bearing 44 may be substantially similar to the inner diameter of the opening 47. Similarly, the inner diameter of the bearing 44 may be substantially similar to the outer diameter of the trunnion 40. This configuration may both tightly secure the ball 30 within the valve 10, and enable the ball 30 to rotate with respect to the trunnion block 42. The trunnion block 42 is rigidly mounted within the body 12. As illustrated, the trunnion block 42 includes two tapered sections 62 configured to substantially match the inner contours of the cylindrical body 12. Because the dimensions of the ball 30 are configured to position the trunnion blocks 42 and 43 against the inner surface of the body 12, the tapered sections 62 serve to limit movement of the trunnion blocks 42 and 43 relative to the body 12. In addition, the trunnion block 42 includes recesses 64 configured to receive pins extending from the closures 14 and 16. These pins serve to further limit movement of the trunnion block 42. While one recess 64 is illustrated on one axial side of the trunnion block 42 in the present embodiment, it will be appreciated that a similar recess 64 may be disposed on the opposite axial side. Furthermore, alternative embodiments may include more or fewer recesses 64 configured to engage respective pins. For example, certain embodiments may include 1, 2, 3, 4, 5, 6, or more recesses 64 disposed on each axial side of the trunnion block 42. Furthermore, a similar pin and recess configuration may be employed on the second trunnion block 43.

As previously discussed, the dowels 38 may serve to rotationally couple the stem 22 to the ball 30. Specifically, the stem 22 includes recesses 66 configured to receive the dowels 38. As illustrated, a diameter of the recesses 66 may substantially coincide with a diameter of the dowels 38 such that the dowels 38 may mount securely within the recesses 66. The ball 30 includes a similar pair of corresponding recesses 68 disposed within an opening 69, and configured to receive the dowels 38. Similar to the recesses 66, a diameter of the recesses 68 may substantially coincide with the diameter of the dowels 38. In this configuration, when the dowels 38 are disposed within the recesses 66 and 68, the stem 22 may be rotationally coupled to the ball 30 such that rotation of the stem 22 induces the ball 30 to rotate.

Furthermore, the thrust bushing 48 and thrust washer 50 are illustrated. As previously discussed, the thrust bushing 48 and thrust washer 50 are disposed about the stem 22 and facilitate rotation of the stem 22. In addition, the retainer 54 is also disposed about the stem 22 and limits movement of the stem 22 in the inward radial direction 52. In the present embodiment, the retainer 54 is a two-piece split ring having a first c-shaped segment 70 and a second c-shaped segment 72. As will be appreciated, further embodiments may include other retainer configurations such as split rings having three or more segments, dowels, pins, fasteners or other suitable retainer configurations. As discussed in detail below, the ring segments 70 and 72 may be disposed within an annular recess of the stem 22. In such a configuration, contact between the retainer 54 and the body 12 may block movement of the stem 22 in the inward radial direction 52. However, once the ring segments 70 and 72 have been removed, the stem 22 may pass through the body 12, trunnion block 42, trunnion 40, and into the bore 32 of the ball 30. Because the length of the stem 22 may be less than an inner diameter of the ball 30, the stem 22 may be positioned entirely within the ball 30 after the retainer 54 has been disengaged. Consequently, the stem 22 may be removed from the valve 10 without uncoupling the closures 14 and/or 16. In this manner, maintenance operations may be performed on the stem 22, seals, bushings, washers or other components within the valve 10 in less time than maintenance operations on a valve configuration in which the closures 14 and/or 16 are removed prior to servicing the internal valve components.

Figure 4:
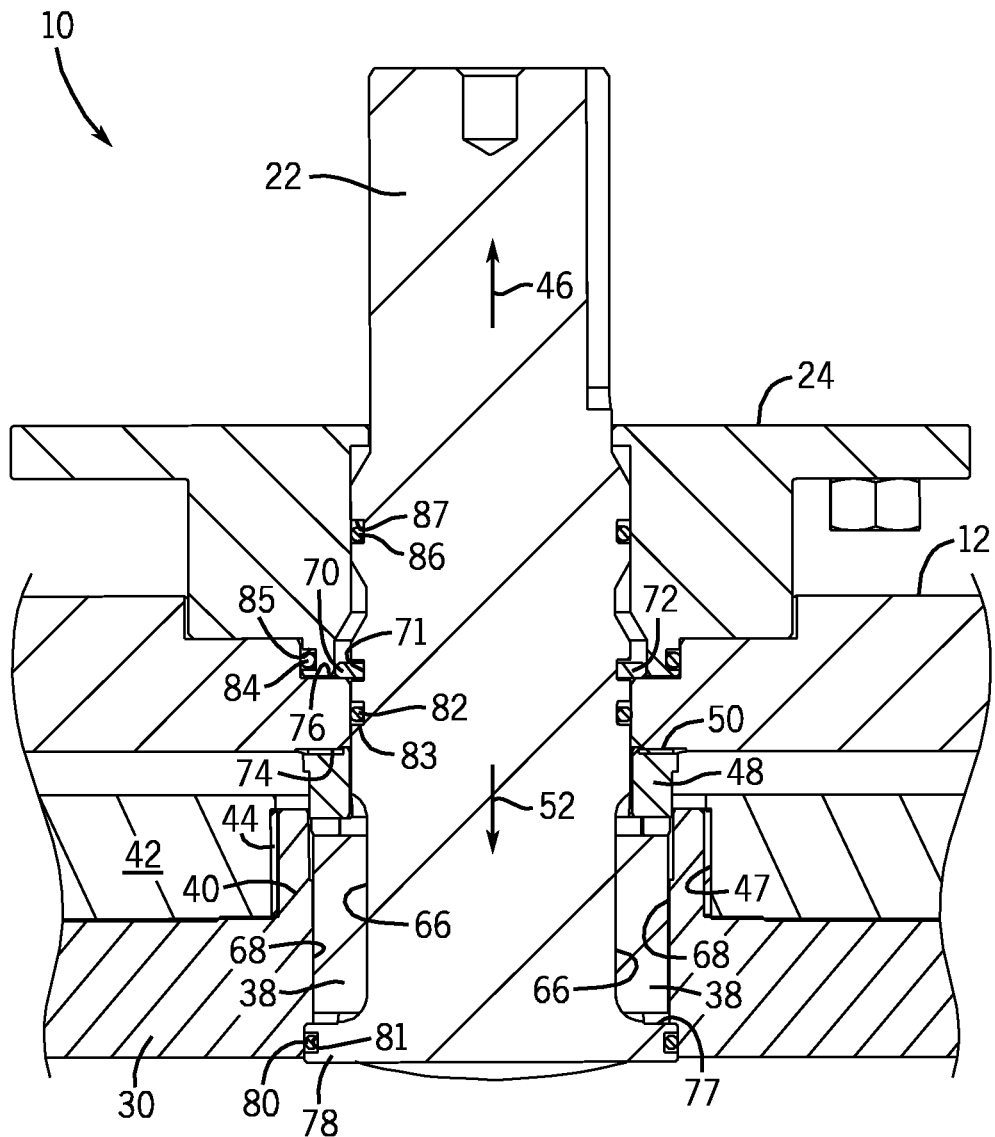
FIG. 4 is a detailed cross-section of an exemplary ball valve, taken within line 4-4 of FIG. 2, in accordance with certain embodiments of the present technique.

FIG. 4 is a detailed cross-section of an exemplary ball valve 10, taken within line 4-4 of FIG. 2. As previously discussed, movement of the stem 22 along the outward radial direction 46 is blocked by contact between the stem 22 and an inner surface 74 of the body 12. Specifically, the thrust bushing 48 and thrust washer 50 transfer the outward load from the stem 22 to the body 12 via contact with the inner surface 74. Conversely, movement of the stem 22 in the inward radial direction 52 is blocked by contact between the retainer 54 and an outward surface 76 of the body 12. Specifically, the first ring segment 70 and the second ring segment 72 of the retainer 54 are disposed within an annular recess 71 of the stem 22. Consequently, contact between the recess 71, the retainer 54 and the outer surface 76 of the body 12 blocks radial movement of the stem 22.

In the illustrated embodiment, the stem 22 includes a flange 78 configured to block a flow of fluid between the ball 30 and the stem 22. As previously discussed, the fluid pressure within the ball 30 exerts a force on the stem 22 in the direction 46. Consequently, the force is resisted by contact between the stem 22 and the body 12 via the thrust bushing 48 and thrust washer 50. In addition, a gap 77 is provided between the stem flange 78 and ball 30 such that the stem 22 does not apply a force to the ball 30 in the direction 46. As will be appreciated, if a substantial force is applied to the ball 30 in the direction 46, the ball 30 may become misaligned within the body 12, thereby establishing leaks within the seats 58 or other components of the valve 10. Therefore, the gap 77 facilitates movement of the stem 22 in the direction 46 without varying the alignment of the ball 30. In addition, an o-ring or other seal 80 is provided within a recess 81 of the flange 78. The seal 80 may serve to further block the flow of fluid from the ball 30.

Similar to the seal 80 within the flange 78, other seals may be provided to block fluid from flowing between the ball 30 and the stem 22. Specifically, an o-ring or other seal 82 may be disposed within a recess 83 of the stem 22. The seal 82 may block fluid from passing between the stem 22 and body 12. In addition, another o-ring or other seal 84 may be disposed within a recess 85 of the adapter plate 24. The seal 84 may block fluid from passing between the adapter plate 24 and the body 12. Furthermore, an o-ring or other seal 86 may be disposed within a recess 87 of the stem 22. The seal 86 may block fluid from passing between the stem 22 and the adapter plate 24. The combination of these seals may serve to substantially reduce or eliminate fluid leakage from the valve 10. In addition, in the event of leakage, the seals 84 and 86 may be easily replaced by removal of the adapter plate 24 as a temporary repair without disassembly of the valve 10.

In certain configurations, the seals 80, 82, 84 and 86 may be rubber o-rings. As will be appreciated, rubber may degrade over time, thereby reducing the effectiveness of the seals. Consequently, the seals may be periodically replaced to ensure proper valve integrity and operation. While the seals 84 and 86 may be accessed by removing the adapter plate 24, seals 80 and 82 may not be accessible without removal of the stem 22. As previously discussed, the stem 22 may be removed by extracting the ring segments 70 and 72 from the recess 71. The stem 22 may then be moved along the direction 52 into the bore 32 of the ball 30. At that point, the stem 22 may be removed from the valve 10 without uncoupling the closures 14 and/or 16, thereby decreasing the duration of maintenance operations compared to configurations in which the ball 30 is removed to access the stem 22. After the stem 22 has been removed, the seals 80 and 82 may be replaced, thereby ensuring proper operation of the ball valve 10.

Figure 5:
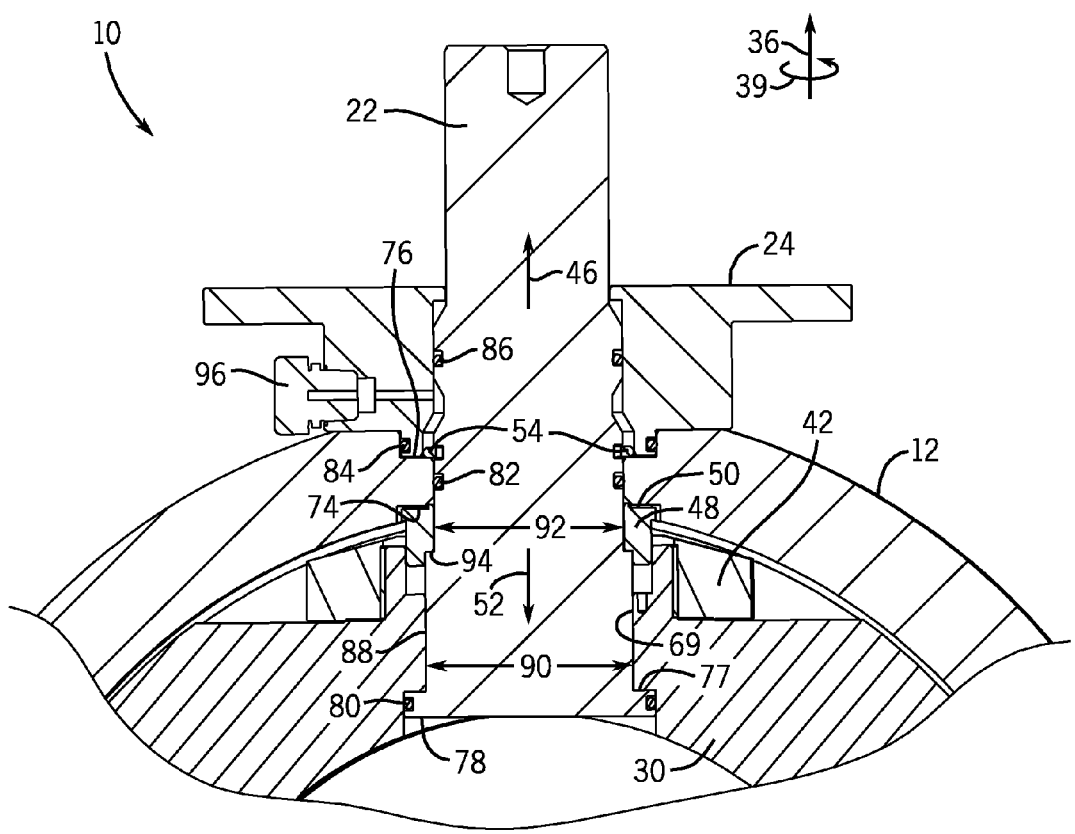
FIG. 5 is a cross-section of an exemplary ball valve, taken along line 5-5 of FIG. 1, in accordance with certain embodiments of the present technique.

FIG. 5 is a cross-section of an exemplary ball valve 10, taken along line 5-5 of FIG. 1. As illustrated, the stem 22 includes a raised portion 88 positioned at an inward side (i.e., along the inward radial direction 52) of the stem 22 adjacent to the flange 78. A diameter 90 of the raised portion 88 is larger than a diameter 92 of an outward portion (i.e., along the outward radial direction 46) of the stem 22. The difference in diameters 90 and 92 establishes a ridge 94 (e.g., annular abutment surface) that extends about the stem 22 in the circumferential direction 39. Due to the radial position (i.e., position along the radial direction 36) of the ridge 94, the recesses 66 configured to receive the dowels 38 form gaps within the ridge 94. Consequently, the ridge 94 is not visible in FIG. 2 (i.e., the cross-section taken along line 2-2 of FIG. 1). The ridge 94 serves to establish a mounting point for the thrust bushing 48 and thrust washer 50. Specifically, force applied to the stem 22 in the direction 46 due to fluid pressure within the ball 30 is resisted by contact between the ridge 94 and the thrust bushing 48. The thrust bushing 48, in turn, applies a force to the thrust washer 50, which is resisted by contact with the inner surface 74 of the body 12. In this manner, any force applied to the stem in the direction 46 is transferred from the stem 22 via the ridge 94 to the body 12. This configuration blocks movement of the stem 22 in the direction 46 even when the retainer 54 has been removed. Consequently, the stem 22 may not be ejected from the valve 10 during maintenance operations due to residual fluid pressure within the ball 30. However, once the retainer 54 has been removed, the stem 22 may move in the inward radial direction 52 and enter the ball 30. As previously discussed, because the length of the stem 22 is limited with respect to a diameter of the bore 32, the stem 22 may be removed from the valve 10 without uncoupling the closures 14 and/or 16, thereby significantly reducing the duration and costs associated with maintenance operations. Furthermore, as illustrated, the valve 10 includes a vent 96 configured to release pressure within the valve 10 prior to removing the stem 22.

Figure 6:
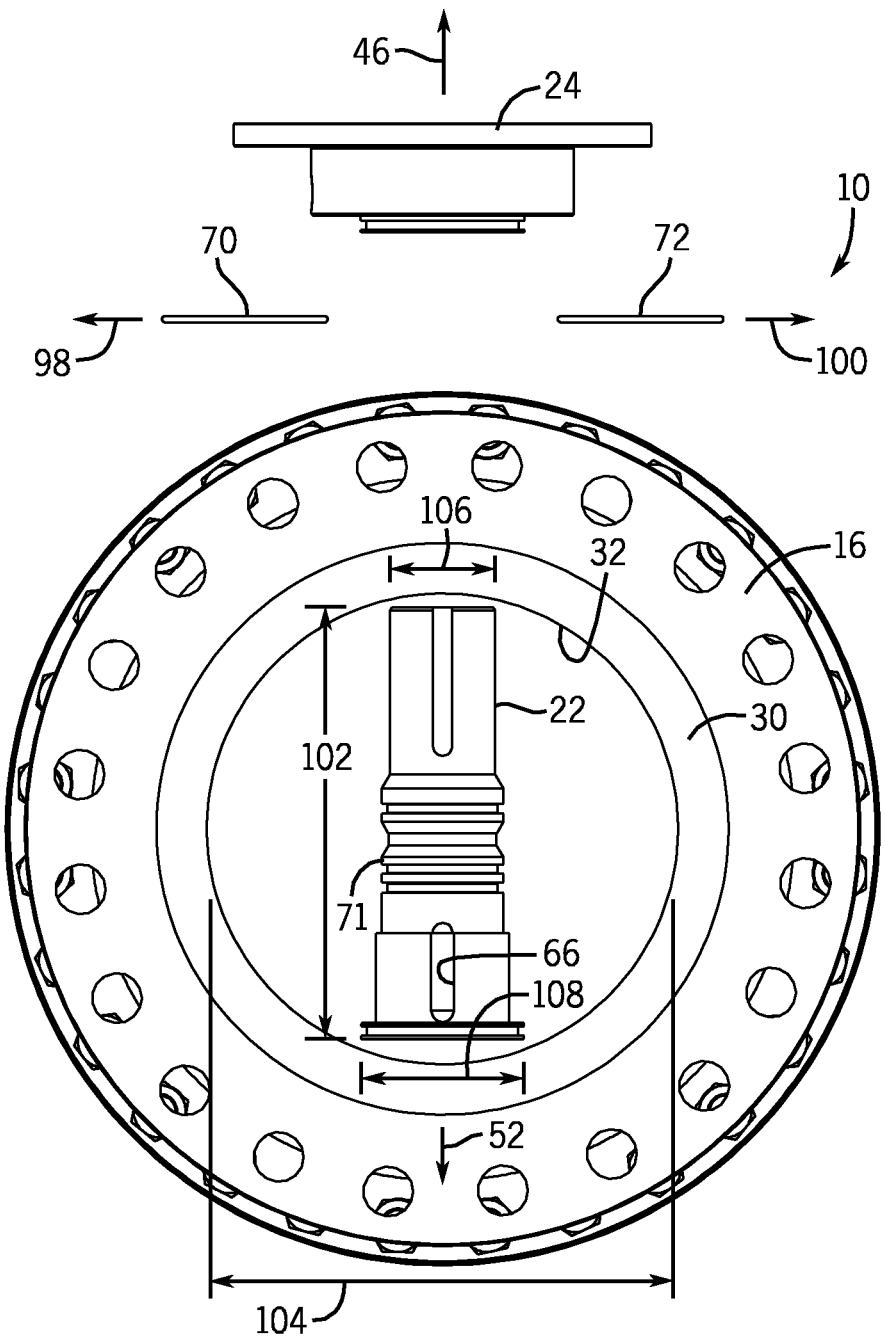
FIG. 6 is an exploded view of an exemplary ball valve, as shown in FIG. 1, in accordance with certain embodiments of the present technique.

FIG. 6 is an exploded view of an exemplary ball valve 10, as shown in FIG. 1, illustrating the steps of removing the stem 22 from the valve 10. First, the adapter plate 24 is uncoupled from the valve 10 and moved in the direction 46 to expose the retainer 54. As previously discussed, in the present embodiment, the retainer is a two-piece split ring including the first segment 70 and the second segment 72. As illustrated, the first segment 70 may be removed from the groove 71 along the direction 98, and the second segment 72 may be removed from the groove 71 along the direction 100. With the retainer 54 uncoupled from the stem 22, the stem 22 may move in the inward radial direction 52 into the bore 32 of the ball 30. As illustrated, a length 102 of the stem 22 is less than a diameter 104 of the bore 32. In addition, the length 102 is selected such that the stem 22 may be positioned within the bore 32 without contact between the stem 22 and the bore 32 despite an outward end (i.e., end along the outward radial direction 46) of the stem 22 having a diameter 106 and an inward end (i.e., end along the inward radial direction 52) of the stem 22 having a diameter 108. In other words, the length 102 is selected such that the stem 22 having particular dimensions may fit within the bore 32 of the ball 30. In this manner, the stem 22 may be removed from the valve 10 by moving the stem in the axial direction 27 through either closure 14 or 16. In this manner, the stem 22 may be removed from the valve 10 without uncoupling the closures 14 and/or 16 from the body 12, thereby reducing the duration and costs associated with valve maintenance.

When the stem 22 passes through the body 12 and into the bore 32 of the ball 30, the seals 80, 82, and 86 may remain attached to the stem 22. Specifically, seal 80 may remain within the recess 81, seal 82 may remain within the recess 83, and seal 86 may remain within the recess 87. In this manner, the seals 80, 82, and 86 may be easily removed from the stem 22 and replaced during the maintenance operation. In addition, removal of the stem 22 may cause the dowels 38 to enter the bore 32, either individually or attached to the stem 22. The dowels 38 may also be removed from the bore 32 through the closures 14 and/or 16. To reassemble the valve 10, the dowels 38 may be disposed within the recesses 66 of the stem 22. The stem 22 may then be aligned with the first trunnion 40 and moved into operating position along the direction 46. The retainer segments 70 and 72 may then be disposed within the recess 71, thereby securing the stem 22 to the body 12. Finally, the adapter plate 24 may be moved into position along the direction 52. In this manner, the stem 22 may be installed within the valve 10 without uncoupling either closure 14 or 16 from the body 12. Due to the large number of fasteners 18 associated with the closures 14 and 16, removing and installing the stem 22 without uncoupling the closures 14 and/or 16 may significantly reduce the duration and costs associated with valve maintenance operations.

Figure 7:
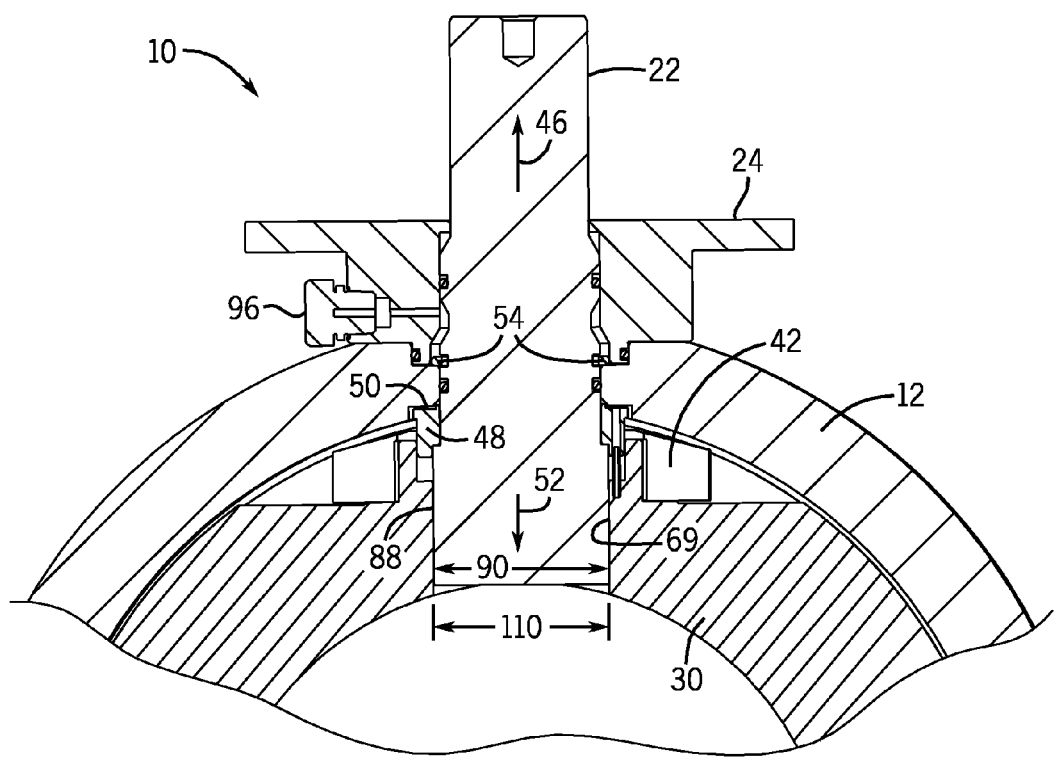
FIG. 7 is a detailed cross-section of an alternative ball valve in accordance with certain embodiments of the present technique.

FIG. 7 is a detailed cross-section of an alternative ball valve 10, including a different stem configuration. Specifically, the stem 22 in the illustrated embodiment omits the flange 78, seal 80 and recess 81 illustrated in the embodiment described with regard to FIG. 4. In the present configuration, the diameter 90 of the raised portion 88 is substantially equal to a diameter 110 of the opening 69. Consequently, fluid flow from the ball 30 may be blocked by contact between the stem 22 and the opening 69. Alternatively, pressure between the valve cavity (e.g., area between the ball 30 and body 12) and the bore 32 may equalize when the valve is open because the seal 80 is omitted. As will be appreciated, because the present configuration does not include the flange 78, manufacturing costs associated with machining the stem 22 may be reduced. However, in the illustrated embodiment, the stem 22 may be removed from the valve 10 in a similar manner to the procedure described above with regard to FIG. 6. Specifically, the adapter plate 24 may be removed, exposing the retainer 54. Removal of the retainer 54 facilitates movement of the stem 22 in the direction 52. Because the diameter 90 of the raised portion 88 is substantially equal to the diameter 110 of the opening 69, the stem 22 may pass through the opening 69 and into the ball 30. Consequently, the stem 22 may be removed without uncoupling the closures 14 and 16, thereby reducing the duration and costs associated with valve maintenance operations.

Figure 8:
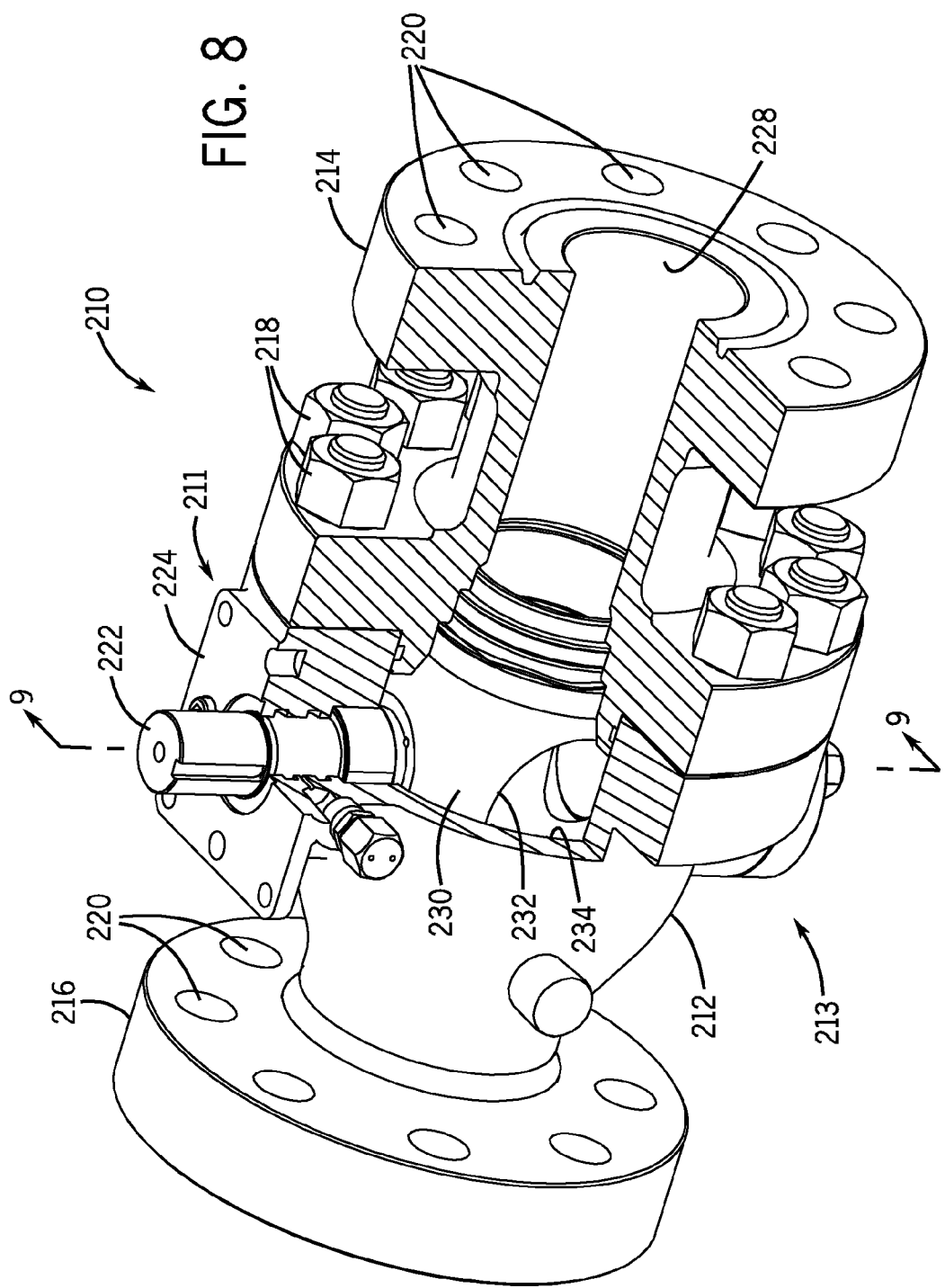
FIG. 8 is a perspective view of a ball valve having an internally retained stem configured to be removed without separating closures from the body in accordance with certain embodiments of the present technique.

FIG. 8 is a perspective view of a ball valve 210 configured to regulate a flow of fluid. As illustrated, the ball valve 210 includes a housing 212 (e.g., two-piece housing) having a closure 214 (e.g., a first closure) coupled to a body 216 (e.g., a main body or second closure). Although the illustrated housing 212 is a two-piece housing, other embodiments of the housing 212 may include a one-piece housing or a multi-piece housing having 3, 4, 5, or more sections. The closures 214 and 216 are configured to seal the housing 212 and secure the valve 210 to fluid conduits. The closures 214 and 216 are coupled together by multiple fasteners 218. In the present configuration, each fastener 218 includes a threaded rod (e.g., bolt), which extends through an opening in the closure 214 and into a complementary threaded recess within the body or closure 216. The threaded rods are then secured by nuts, thereby securing the closure 214 to the body or closure 216. As will be appreciated, the number of fasteners 218 may be selected to provide a proper seal between the closures 214 and 216, thereby sealing the valve 210. Specifically, the fasteners 218 are configured to substantially reduce the formation of gaps between the closures 214 and 216, such that the housing 212 generally does not permit fluid to leak from the valve 210. For example, in certain embodiments, the closures 214 and 216 may be coupled together by more than 3, 5, 10, 15, 20, 25, 30, 35, 40, 45, 50, or more fasteners 218. In an alternative embodiment, the closures 214 and 216 are secured to one another by a welded connection, thereby making the housing 212 a one-piece structure. In such an embodiment, the fasteners 218 may be omitted.

Each closure 214 and 216 includes multiple openings 220 configured to couple each closure 214 and 216 to a fluid conduit. As will be appreciated, fasteners may pass through the openings 220 and corresponding openings within respective conduits to secure the closures 214 and 216 to the conduits. The number of openings may be selected to substantially reduce the possibility of fluid leakage between the closures 214 and 216 and the conduits. For example, the closures 214 and 216 may include more than 3, 5, 10, 15, 20, 25, 30, 35, 40, 45, 50, or more openings 220.

As discussed in detail below, the valve 210 includes a ball 230 configured to rotate from an open position to a closed position. The ball 230 includes a bore 232 (e.g., a cylindrical bore) that facilitates the passage of fluid through the valve 210. In the open position, the bore 232 of the ball 230 is aligned with a bore 228 (e.g., a cylindrical bore) of the closure 214 and a bore 234 (e.g., a cylindrical bore) of the closure 216, such that fluid may pass through the valve 210. In the closed positioned, the bore 232 is rotated perpendicular to the closures 214 and 216, thereby substantially blocking the passage of fluid through the valve 210. As will be appreciated, rotating the ball 230 to an orientation between the open and closed positions may establish a desired flow rate of fluid through the valve 210 by adjusting the fluid passage area. The ball 230 is rotationally coupled to a stem 222, such that rotation of the stem 222 causes the ball 230 to rotate. In certain embodiments, the stem 222 is a cylindrical shaft within one or more annular grooves, shoulders, or other features to facilitate sealing and retention in the housing 212. Furthermore, the stem 222 is coupled to an adapter plate or mounting portion 224 configured to mount with a variety of valve control components. For example, the mounting portion 224 may be mounted to an electric or hydraulic actuator configured to remotely control the position of the ball within the valve 210. Alternatively, the mounting portion 224 or stem 222 may be coupled to a handle such that the valve 210 may be operated manually.

As discussed in detail below, the stem 222 is configured to be removed from the valve 210 without uncoupling the closures 214 and/or 216 from one another. Due to the large number of fasteners 218 that couple the closures 214 and 216 together, the process of separating the closures 214 and 216 may be time-consuming. Consequently, the stem 222 of the present embodiment may be removed from the valve 210 without uncoupling the fasteners 218. Specifically, the stem 222 may be retained by a removable retainer configured to block inward movement of the stem 222. Once the retainer has been removed, the stem 222 may pass through the housing 212 from a first side 211 to a second side 213, thereby completely passing through the housing 212. As the stem 222 passes through the housing 212 from the first side 211 to the second side 213, the stem 222 passes through the ball 230 before removal from the valve 210 on the second side 213. In some embodiments, the stem 222 may be optionally removed through the bore 232 of the ball 230. In such embodiments, the stem 222 may have a length that is equal to or lesser than the diameter of the bore 232 of the ball 230, and at least one of the bores 228 or 234. However, in other embodiments, the stem 222 may have a length that is greater than the diameter of the bore 232 of the ball 230, thereby helping to guide the stem 222 through the ball 230 when removing the stem 222 from the first side 211 to the second side 213 of the housing 212. In the illustrated embodiment, the stem 222 is mounted within, and selectively removable from, the closure or body 216 of the housing 212. However, in other embodiments, the stem 222 is mounted within, and selectively removable from, the closure 214 of the housing 212, or both the first and second closures 214 and 216 of the housing 212. Again, once released, the stem 222 is able to pass completely through the housing 212 for removal without separating the first and second closures 214 and 216 and without separating any conduits from the first and second closures 214 and 216, thereby substantially simplifying the stem 222 removal process to reduce time and costs associated with maintenance operations.

Figure 9:
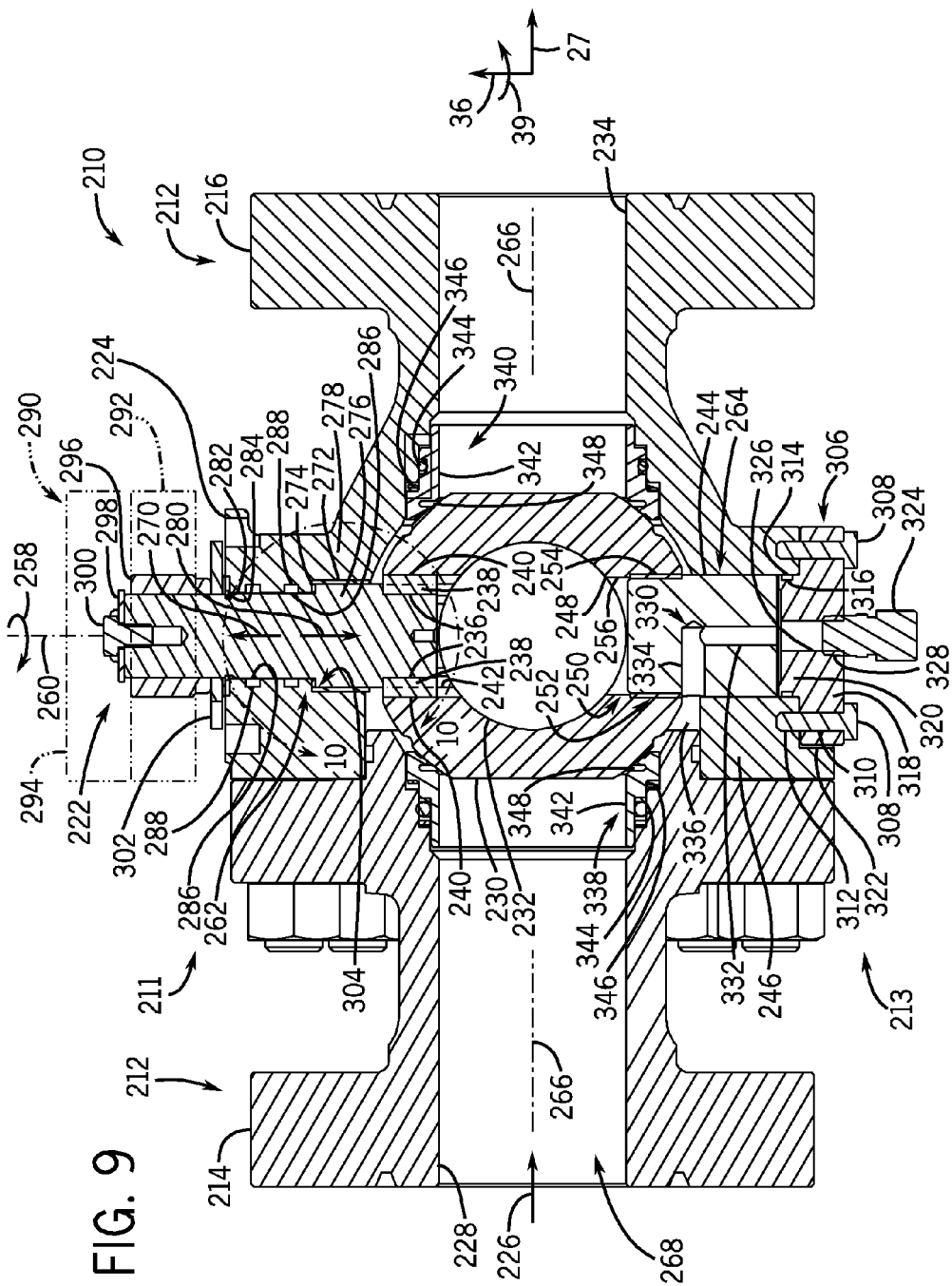
FIG. 9 is a cross-section of an exemplary ball valve, taken along line 9-9 of FIG. 8, in accordance with certain embodiments of the present technique.

FIG. 9 is a cross-section of an exemplary ball valve 210, taken along line 9-9 of FIG. 8. As illustrated, the valve 210 is in the closed position, thereby blocking a flow of fluid 226 in an axial direction 27. In the open position (not shown), the fluid enters the bore 228 of the closure 214, flows through the bore 232 of the ball 230, and exits the bore 234 of the closure 216. In the closed position as shown, the ball 230 is rotated such that the bore 232 is generally crosswise (e.g., perpendicular) to the axial direction 27 through the bores 228 and 234 of the first and second closures 214 and 216, and thus the sides of the ball 230 block fluid flow through the valve 210. As previously discussed, the ball 230 may rotate about a radial axis 36 to regulate the flow of fluid 226 through the valve 210. Rotating the ball 230 varies the flow area between the bore 232 and the closures 214 and 216, thereby adjusting the flow rate of fluid 226. To facilitate rotation of the ball 230, the stem 222 is rotationally coupled to the ball 230 by dowels 238 disposed in recesses 236 of the stem 222 and recesses 240 in an opening 242 of the ball 230. While two dowels 238 are illustrated in the present embodiment, it should be appreciated that more or fewer dowels 238 may be employed in alternative embodiments. For example, certain embodiments may include 1, 2, 3, 4, 5, 6, 7, 8, or more dowels 238 disposed about the stem 222 (and mounted within recesses 236 and 240) in a circumferential direction 39. In certain embodiments, the stem 222 may be coupled to the ball 230 and housing 212 in the same (or a similar) manner as set forth in FIGS. 1-7. In an alternative embodiment, the stem 222 may be rotationally coupled to the ball 230 by a spline connection, a plurality of teeth, a tongue in groove connection, or any combination thereof.

In addition to the stem 222, the ball 230 is coupled to a trunnion 244 on the second side 213 of the housing 212. The trunnion 244 extends in the radial direction 36 from a trunnion support portion 246 of the housing 212 (e.g., closure 216) into an opening 248 in the ball 230. The trunnion 244 is coupled to the ball 230 by a rotatable joint 250, which includes a trunnion bearing 252 disposed between the trunnion 244 and the opening 248 in the ball 230. For example, the trunnion bearing 252 may be an annular bearing, which fits between an annular surface 254 of the trunnion 244 (e.g., cylindrical shaft) and an annular surface 256 of the opening 248 (e.g., cylindrical opening). The trunnion bearing 252 reduces friction between the ball 230 and the trunnion 244, thereby facilitating rotation of the ball 230 relative to the trunnion 244 in response to a rotational force 258 imparted by the stem 222 onto the ball 230 about a rotation axis 260 of the valve 210.

In the illustrated embodiment, the stem 222 is disposed in an opening or bore 262 in the first side 211 of the housing 212 (e.g., closure 216), while the trunnion 244 is disposed in an opening or bore 264 in the second side 213 of the housing 212 (e.g., closure 216). As discussed in further detail below, the openings or bores 262 and 264 in the housing 212 are aligned with the openings 242 and 248 in the ball 230, such that the stem 222 can be installed, accessed, removed, and/or replaced through the housing 212 along the rotational axis 260. For example, the stem 222 may be installed or removed along the rotational axis 260, which is generally crosswise or transverse (e.g., perpendicular) to a longitudinal axis 266 of a fluid passage 268 through the valve 210. The fluid passage 268 generally includes the bore 228 of the closure 214, the bore 232 of the ball 230, and the bore 234 of the closure 216. The stem 222 is removable along the rotational axis 260 without disconnecting the first and second closures 214 and 216 and without disconnecting any fluid conduits from the first and second closures 214 and 216. This simplified arrangement is enabled by the mounting configuration of the stem 222 in the bore 262 through the first side 211 of the housing 212 (e.g., closure 216) and the mounting configuration of the trunnion 244 in the bore 264 through the second side 213 of the housing 212 (e.g., closure 216).

During operation of the valve 210, the stem 222 is retained such that movement along the radial direction 36 is blocked. Specifically, movement of the stem 222 along an outward radial direction 270 away from the ball 230 is blocked by contact between the stem 222 and the housing 212 (e.g., closure 216). In other words, the stem 222 is internally retained by the housing 212. As will be appreciated, fluid pressure within the ball 230 may exert a force on the stem 222 in the direction 270. For example, the fluid pressure may be approximately between 0 to 15,000, 0 to 5625, 0 to 3750, 0 to 2000, or about 0 to 290 psi. In certain embodiments, the area of the stem 222 exposed to the fluid within the ball 230 may be approximately between 0.5 to 4, 1 to 3, or about 2 square inches. Therefore, if the pressure within the ball 230 is approximately 24000 psi and the area of the stem 222 is approximately 2 square inches, the fluid may exert a force of approximately 8000 pounds on the stem 222 in the direction 270. Consequently, the present embodiment may include a thrust bushing and/or bearing 272 and a thrust washer 274 to facilitate rotation of the stem 222 relative to the housing 212 despite the large contact force between the stem 222 and the housing 212. As discussed in detail below, the thrust bushing 272 and thrust washer 274 may be disposed about the circumference of the stem 222 between a raised portion 276 of the stem 222 and a recessed portion 278 of the housing 212.

Furthermore, the stem 222 is retained along an inward radial direction 280 by a retainer 282 (e.g., c-shaped retainer). The retainer 282 is disposed within a recess 284 (e.g., annular groove) of the stem 222, and contacts an outer surface of the housing 212 (e.g., closure 216), thereby blocking movement of the stem 222 in the inward radial direction 280. As will be appreciated, other retention configurations, such as snap-type rings or fixed collars, among others, may be employed in alternative configurations. In further embodiments, the stem 222 may be retained by contact between one or more seals 286 (e.g., annular seals) disposed in grooves 288 (e.g., annular grooves) between the stem 222 and housing 212. For example, the illustrated embodiment includes two seals 286 in respective grooves 288 at an offset from one another. Although the illustrated seals 286 and grooves 288 are disposed within the bore 262 of the housing 212, other embodiments may position the seals 286 and grooves 288 in the stem 222 and/or the housing 212.

One or more actuators 290 may be coupled to the stem 222 on the first side 211 of the housing 212. For example, the actuator 290 may include a manual actuator 292 and/or a powered actuator 294. The manual actuator 292 may include a handle, wheel, tool interface (e.g., wrench interface), or other manually movable structure. The powered actuator 294 may include an electric drive (e.g., an electric motor), a hydraulic drive, a pneumatic drive, or any combination thereof. The actuator 290 may couple to the stem 222 via an actuator coupling or mount 296, which may be retained by a retention washer 298 and a retention fastener 300 (e.g., bolt). The valve 210 also includes a lock plate or stop plate 302 disposed between the actuator coupling 296 and the mounting portion 224 of the housing 212. The stop plate 302 covers the retainer 282 disposed within the recess 284 of the stem 222, thereby blocking radial movement 36 (i.e., in the outward radial direction 270) of the stem 222 away from the housing 212 and the ball 230. In other words, while the retainer 282 is disposed within the recess 284 of the stem 222, the retainer 282 is sandwiched between the stop plate 302 and the mounting portion 224, such that the retainer 282 blocks radial movement 36 in both the inward and outward radial directions 270 and 280.

During maintenance operations, the stem 222 may be released from the housing 212 by removing the actuator 290, removing the stop plate 302, and then removing the retainer 282 from the recess 284 in the stem 222. Upon removal of the retainer 282, a radial abutment 304 between the raised portion 276 and recessed portion 278 blocks movement of the stem 222 in the outward radial direction 270, while the stem 222 is free to move in the inward radial direction 280. With this freedom of movement, the stem 222 may be lowered into the ball 230, e.g., through the opening 242 in the ball 230. In certain embodiments as discussed above with reference to FIGS. 1-7, the stem 222 may be removed through the bore 232 in the ball 230 and one of the bores 228 or 234 in the housing 212. However, in the illustrated embodiment, the stem 222 may be removed from the second side 213 of the housing 212 after removal of the trunnion 244 and a trunnion plate or retention cover 306.

As illustrated in FIG. 9, the cover 306 is configured to selectively retain the trunnion 244 within the bore 264 of the housing 212 (e.g., closure 216) and the opening 248 in the ball 230. The cover 306 may be secured to the housing 212 by a plurality of fasteners 308, such as threaded fasteners. For example, the fasteners 308 may include bolts that extend through openings 310 in the cover 306, and then thread into threaded receptacles 312 in the housing 212. Thus, the cover 306 may be removed from the housing 212 by unthreading the fasteners 212. The cover 306 also may include one or more seals, such as a seal 314 (e.g., annular seal) disposed in a groove 316 (e.g., annular groove), disposed between the cover 306 and the housing 212. The seal 314 helps to block fluid leakage from the passage 268. In the illustrated embodiment, the cover 306 has a plate portion 318 and a plug portion 320, wherein the plate portion 318 is disposed in a cover recess 322 along the housing 212, and the plug portion 320 extends into the bore 264 of the housing 212. The illustrated seal 314 and groove 316 are disposed about the plug portion 320, although other embodiments may include one or more seals 314 and grooves 316 disposed along the plate portion 318 and/or the plug portion 320. The cover 306 also includes a pressure release plug 324 (e.g., a bleed plug, valve, or a combination thereof) disposed within a passage 326 through the cover 306. For example, the plug 324 may be coupled to the passage 326 with mating threads 328 (e.g., first and second mating threads) between the plug 324 and the passage 326. The trunnion 244 also includes a passage 330 in fluid communication with the passage 326 in the cover 306. For example, the passage 330 may include first and second passages 332 and 334, which are oriented crosswise to one another and intersect one another. The illustrated passages 326 and 330 (i.e., 332 and 334) are also in fluid communication with the fluid passage 268 of the valve 210, e.g., a cavity 336 between the housing 212 and the ball 330. For example, the cavity 336 may be positioned between the ball 330 and first and second seat assemblies 338 and 340, wherein each seat assembly 338 and 340 includes a piston 342, a seal 344 (e.g., annular seal), a spring 346 (e.g., a wave spring), and a seat 348 (e.g., an annular seat 348). Each seat assembly 338 and 340 is biased against the ball 330 to facilitate sealing between the ball 330 and the housing 212.

During the removal of the stem 222, the pressure release plug 324 may be removed to release pressure from the valve 212 prior to removal of the cover 306 and the trunnion 244. In some embodiments, the plug 324 may include a pressure release valve, which may be opened by rotating the plug 324. Upon release of the plug 324 (or opening of any valve in the plug 324), any residual fluid pressure in the cavity 336 may exit the valve 210 through the passages 330 and 326. After this pressure release, the cover 306 may be removed from the housing 212 by unthreading the fasteners 308. With the cover 306 removed, the trunnion 244 may be removed from the bore 264, thereby unblocking the opening 248 in the ball 230 and the bore 264 in the housing 212. Once the retainer 282 is removed from the stem 222 as discussed in detail above, the stem 222 may be lowered completely through the ball 230 (e.g., through both openings 242 and 248 in the ball 230), and completely through the bore 264 in the second side 213 of the housing 212. In this manner, the stem 222 may be removed from the housing 212 of the valve 212 without disconnecting the first and second closures 214 and 216 and without disconnecting any conduits coupled to the closures 214 and 216.

Figure 10:
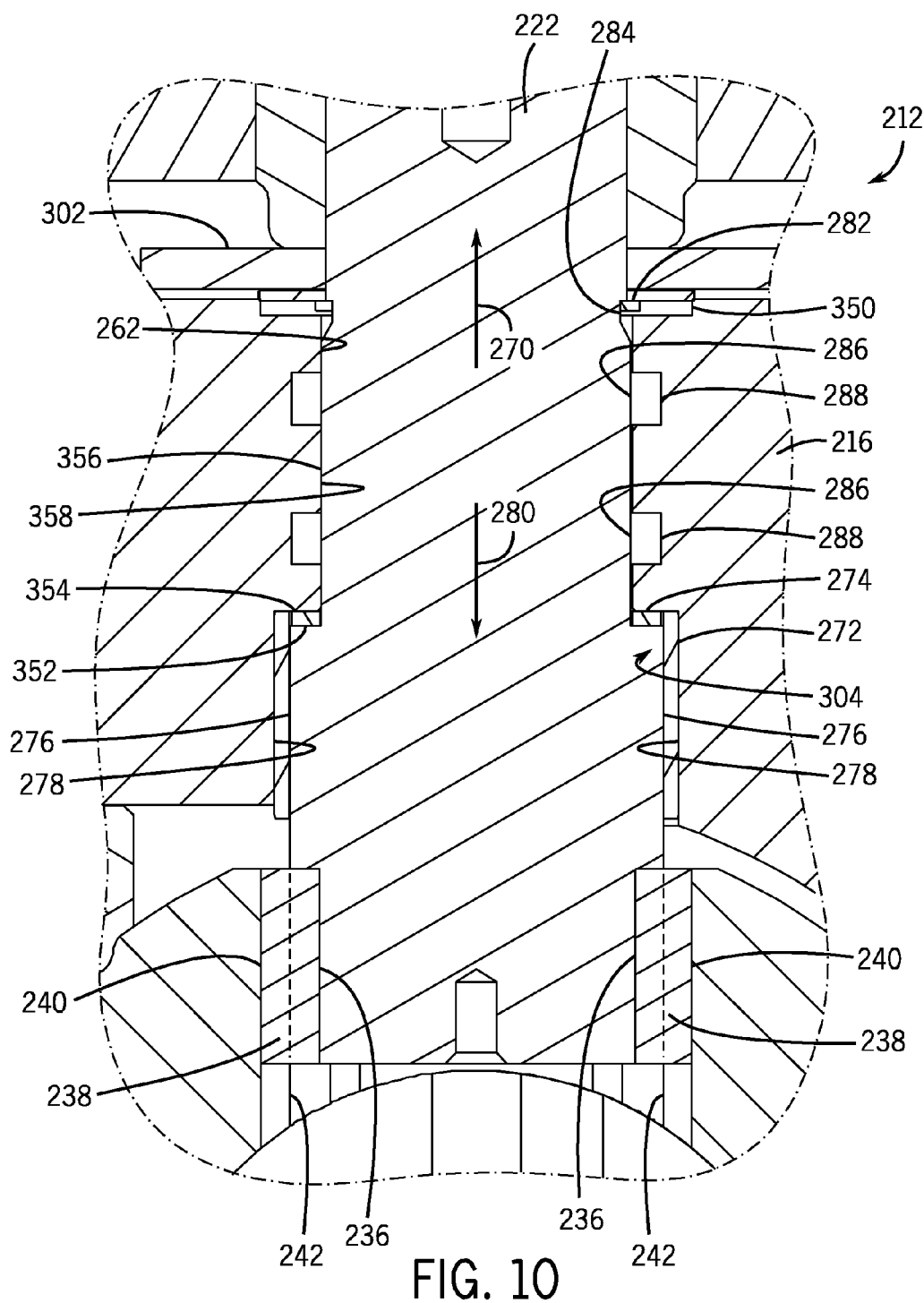
FIG. 10 is a detailed cross-section of an exemplary ball valve, taken within line 10-10 of FIG. 9, in accordance with certain embodiments of the present technique.

FIG. 10 is a partial cross-section of the ball valve 210 of FIG. 9, taken within line 10-10, illustrating the stem 222 disposed within the bore 262 in the housing 212 (e.g., closure 216). As illustrated, the stem 222 is selectively retained by the retainer 282 (e.g., a C-shaped ring), which is seated within the recess 284 (e.g., annular recess) in the stem 222 and a corresponding recess 350 (e.g., annular recess) in the housing 212. In this seated position, the retainer 282 spans across the bore 262 supporting the stem 222, such that the retainer 282 blocks movement of the stem 222 in the inward radial direction 280. The retainer 282 is also covered by the stop plate 302, which blocks the retainer 282 and stem 222 from moving in the outward radial direction 270. In addition to the retainer 282, the stem 222 is internally retained within the housing 212 of the valve 210 by the radial abutment 304. As illustrated, the radial abutment 304 includes a first radial abutment 352 along the stem 222 and a second radial abutment 354 along the bore 262. For example, the first radial abutment 352 may be an annular shoulder or lip, which is formed between the raised portion 276 and a reduced portion 356 of the stem 222. In certain embodiments, the raised portion 276 is a first cylindrical portion, the reduced portion 356 is a second cylindrical portion, and the first cylindrical portion 276 has a greater diameter than the second cylindrical portion 356. Similarly, the second radial abutment 354 may be an annular shoulder or lip, which is formed between the recessed portion 278 and a main portion 358 of the bore 262. In certain embodiments, the recessed portion 278 is a first cylindrical bore portion, the main portion 358 is a second cylindrical bore portion, and the first cylindrical bore portion 278 has a greater diameter than the second cylindrical bore portion 358. Together, the first and second radial abutments 352 and 354 block movement of the stem 222 in the outward radial direction 270, even if the retainer 282 is removed from the stem 222. Once the retainer 282 is removed, then the stem 222 is removed in the inward radial direction 280 as discussed above.

In the illustrated embodiment, the stem 222 also includes the seals 286, the thrust bushing or bearing 272, and the thrust washer 274 to facilitate rotation of the stem 222 and ball 230 while maintaining a fluid seal between the stem 222 and the housing 212. For example, the seals 286 may be annular seals made of an elastomer, a metal, a fabric, or any combination thereof. The bearing 272 and washer 274 may be configured to reduce friction despite a load in the outward radial direction 270 caused by fluid pressure inside the valve 210.

Figure 11:
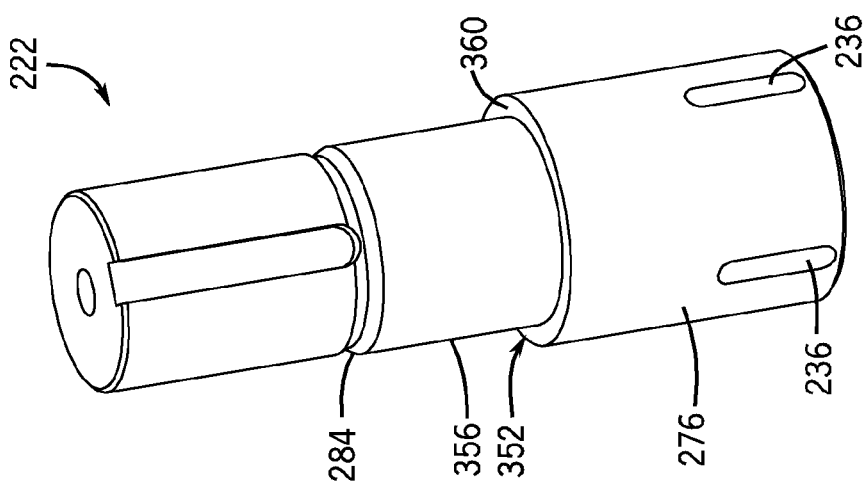
FIG. 11 is a perspective view of an exemplary stem of the ball valve of FIGS. 8-10, in accordance with certain embodiments of the present technique.

Again, the illustrated stem 222 is coupled to the ball 230 via one or more dowels 238, which fit within recesses 236 in the stem 222 and recesses 240 in the opening 242 in the ball 230. FIG. 11 is a perspective view of an embodiment of the stem 222 of FIGS. 9 and 11, further illustrating details of the recess 284 for the retainer 282, the first axial abutment 352, and the recesses 236 for the dowels 238. In the illustrated embodiment, the recess 284 for the retainer 282 is an annular recess extending circumferentially about the reduced portion 356 of the stem 222. Again, the retainer 282 may be a C-shaped retainer, which fits within the recess 284 to secure the stem 222 to the housing 212. The first radial abutment 352 includes an annular shoulder or lip 360, which is formed between the raised portion 276 and the reduced portion 356 of the stem 222. As illustrated, the portions 276 and 356 are cylindrical portions, which have different diameters to define the lip 360. Again, the lip 360 helps to internally retain the stem 222 within the housing 212. The recesses 236 for the dowels 238 are elongated lengthwise along the stem 222, and are spaced circumferentially about the raised portion 276 of the stem 222. In the illustrated embodiment, the stem 222 includes four equally spaced recesses 236 for the dowels 238. Again, the dowels 238 fit within the recesses 236 in the stem 222 and corresponding recesses 240 in the ball 230 to selectively couple the stem 222 to the ball 230. In other embodiments, the stem 222 may include 1, 2, 3, 4, 5, 6, 7, 8, 9, 10, or more recesses 236 for the dowels 238.

Figure 12:
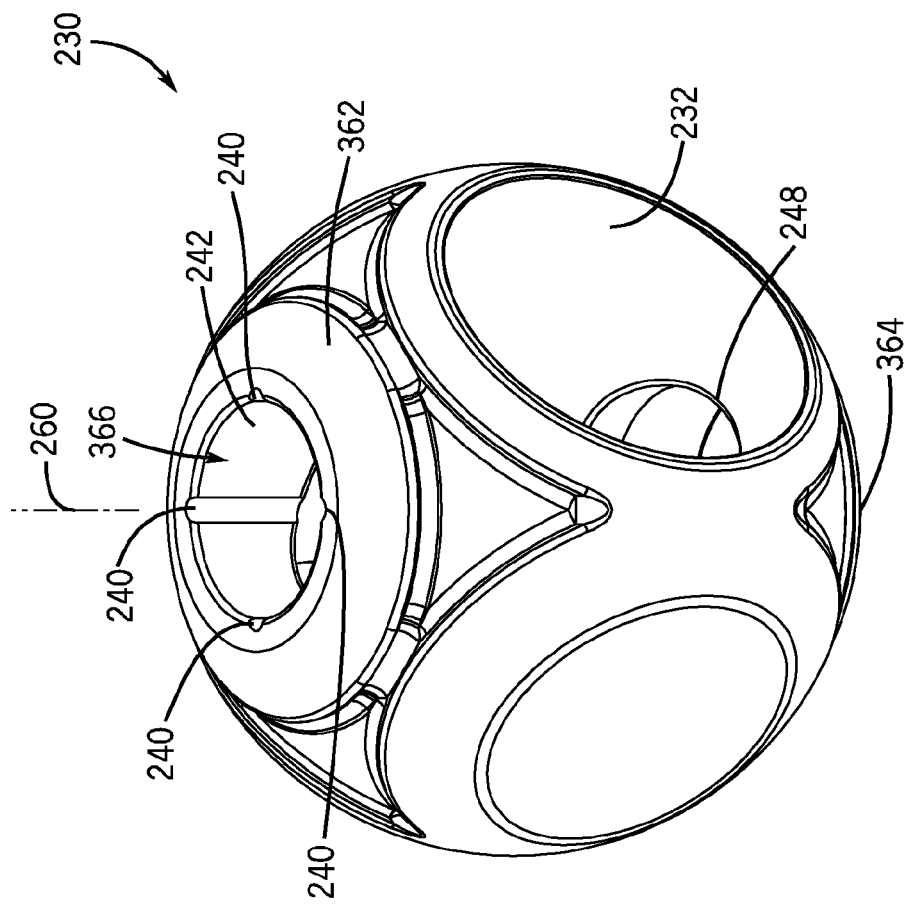
FIG. 12 is a perspective view of an exemplary ball of the ball valve of FIGS. 8-10, in accordance with certain embodiments of the present technique.

FIG. 12 is a perspective view of an embodiment of the ball 230 of FIGS. 9 and 11, further illustrating details of the opening 242 for the stem 222 and the opening 248 for the trunnion 244. In the illustrated embodiment, the opening 242 includes four equally spaced recesses 240 for the dowels 238, which also fit within the recesses 236 in the stem 222. Again, the recesses 236 and 240 mate with the dowels 238 to removably couple the stem 222 to the ball 230. In other embodiments, the opening 242 may include 1, 2, 3, 4, 5, 6, 7, 8, 9, 10, or more recesses 240 for the dowels 238. The ball 230 also includes the bore 232 extending completely through the ball 230, wherein bore 232 is selectively aligned with the bores 228 and 234 in the housing 212 to permit fluid flow through the valve 210. The opening 242 is disposed on a first side wall 362 of the ball 230, and intersects with the bore 232 in the ball 230. Likewise, the opening 248 is disposed on a second side wall 364 of the ball 230, and intersects with the bore 232 in the ball 230. Together, the openings 242 and 248 and the bore 232 define a passage 366 completely through the ball 230 for selectively installing and removing the stem 222. For example, as illustrated, the passage 366 has an axis 366 disposed along the rotational axis 260 of the valve 210, wherein the axis 366 is generally crosswise (e.g., perpendicular) to an axis 368 of the bore 232.

Figure 13:
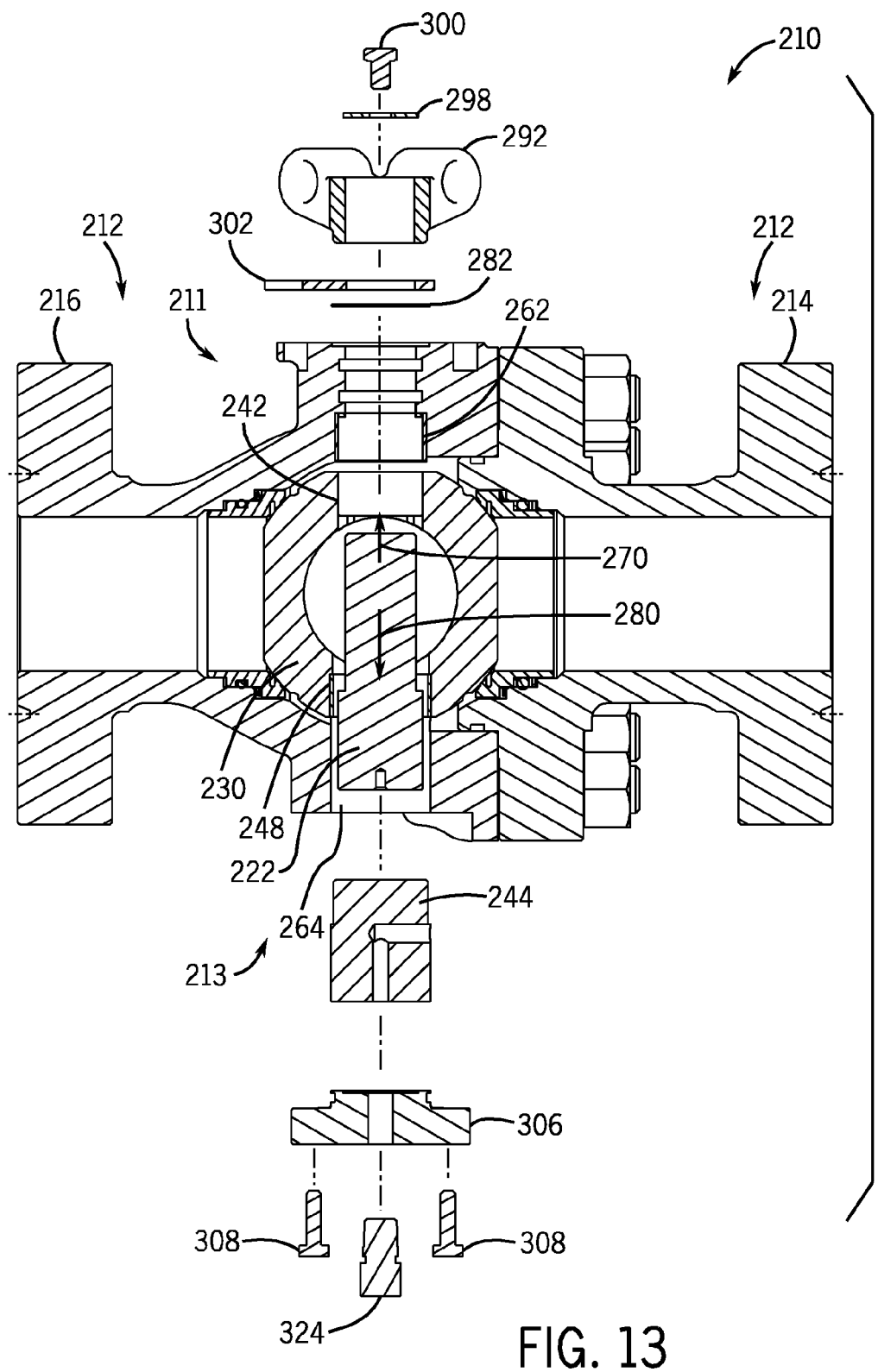
FIG. 13 is an exploded cross-section of an exemplary ball valve, as shown in FIGS. 8-12, in accordance with certain embodiments of the present technique.

FIG. 13 is a cross-section of an exemplary ball valve 210, illustrating components of the valve 210 exploded from the housing 212 during a servicing operation. In the illustrated embodiment, the pressure release plug 324 (e.g., or pressure release valve) is opened and/or removed to release any internal pressure within the valve 212, thereby substantially eliminating any force against the stem 222 in the outward radial direction 270. After this pressure release, the trunnion plate or retention cover 306 is removed by unthreading the fasteners 308 from the housing 212, thereby enabling removal of the trunnion 244. The trunnion 244 is then removed through the bore 264 in the second side 213 of the housing 212. With the cover 306 and trunnion 244 removed from the housing 212, the openings 242 and 248 in the ball 230 and the bore 264 are open to permit removal of the stem 222. Accordingly, the retention fastener 300 (e.g., bolt) is removed to enable removal of the retention washer 298 and the manual actuator 292, thereby further enabling removal of the stop plate 302. Upon removal of the stop plate 302, the retainer 282 is removed from the stem 222, thereby enabling inward radial movement 280 of the stem 222. At this point, the stem 222 may be removed from the housing 212 by passing the stem 222 through the bore 262 on the first side 211 of the housing 212, through the opposite openings 242 and 248 in the ball 230, through the bore 264 on the second side 213 of the housing 212, and out of the housing 212 of the valve 210. In this manner, the stem 222 may be removed without disconnecting the first and second closures 214 and 216 and without disconnecting any fluid conduits from the first and second closures 214 and 216.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a valve assembly, comprising:
a valve body having a fluid passage, a fluid chamber along the fluid passage, and a stem bore extending crosswise to the fluid passage through a first side of the valve body into the fluid chamber;
a valve disposed in the fluid chamber; and
a valve stem disposed in the stem bore on the first side of the valve body and coupled to the valve, wherein the valve stem is internally retained within the valve body via at least one internal retainer, at least one removable retainer is disposed between an outer surface of the valve stem and an inner surface of the valve assembly to block inward movement of the valve stem along an axis of the stem bore, the valve assembly is configured to enable removal of the valve stem from the valve body via release of the at least one internal retainer and movement of the valve stem along an internal path through valve body while the valve remains disposed in the fluid chamber, and the valve stem is configured to be removed along the internal path in an inward direction through the stem bore in the first side of the valve body toward the fluid chamber followed by an outward direction through the stem bore in a second side of the valve body.

2. The system of claim 1, wherein the at least one internal retainer comprises a first internal retainer that blocks movement of the valve stem along an axis of the stem bore, and a second internal retainer that blocks movement of the valve stem along the axis of the stem bore.

3. The system of claim 2, wherein the first and second internal retainers are offset from one another along the axis of the stem bore, and each of the first and second internal retainer blocks movement of the valve stem in an outward radial direction along the axis of the stem bore.

4. The system of claim 2, wherein the first internal retainer blocks movement between the valve stem and the valve body, and the second internal retainer blocks movement between the valve stem and the valve.

5. The system of claim 2, wherein the first internal retainer comprises a first annular abutment facing outwardly away from the fluid chamber in the valve body, and the second internal retainer comprises a second annular abutment facing outwardly away from the fluid chamber in the valve body.

6. The system of claim 5, wherein the first internal retainer comprises a bushing adjacent the first annular abutment between the valve stem and the valve body, and the second internal retainer comprises a seal adjacent the second annular abutment between the valve stem and the valve.

7. The system of claim 6, wherein the second annular abutment comprises an annular flange having the seal disposed about an outer circumference of the annular flange.

8. The system of claim 6, comprising another seal disposed between the valve stem and the valve body.

9. The system of claim 1, wherein the at least one internal retainer comprises first and second protrusions in the valve stem extending away from an axis of the valve stem, the first protrusion extends to a first radius and blocks axial movement of the valve stem relative to a first internal shoulder, the second protrusion extends to a second radius and blocks axial movement of the valve stem relative to a second internal shoulder, and the first and second radii are different from one another.

10. The system of claim 1, wherein the at least one removable retainer comprises a split ring.

11. The system of claim 1, wherein the at least one removable retainer comprises a first c-shaped portion and a second c-shaped portion.

12. The system of claim 1, wherein the at least one removable retainer is disposed between the outer surface of the valve stem and the inner surface of the stem bore in the valve body.

13. The system of claim 1, wherein the at least one removable retainer is disposed between the valve body and an adapter removably coupled to the valve body.

14. The system of claim 1, wherein the valve stem is internally retained within the valve body without any threaded fasteners.

15. The system of claim 1, wherein the valve body blocks blowout of the valve stem through the stem bore.

16. The system of claim 1, wherein the valve stem is not removable in an outward direction away from the fluid chamber through the stem bore in the first side of the valve body.

17. The system of claim 1, wherein the valve assembly has an axial path configured to enable installation and removal of the valve stem relative to the valve body only via axial movement along the axis of the stem bore and the axial path while the valve remains disposed in the valve body.

18. The system of claim 1, wherein the valve stem is removable through the fluid passage.

19. The system of claim 1, wherein the valve stem is removable through an opening different from the fluid passage and the stem bore.

20. The system of claim 1, wherein the at least one internal retainer is not externally accessible and removable through the stem bore on the first side of the valve body.

21. The system of claim 1, wherein the valve stem is configured to be installed and removed from the valve body only via axial movement along an axis of the stem bore.

22. The system of claim 1, wherein the valve comprises a ball valve.

23. A system, comprising:
a valve assembly, comprising:
a valve body;
a valve disposed in the valve body; and
a valve stem coupled to the valve, wherein the valve stem is internally retained within the valve body via at least one internal retainer within the valve body, the valve assembly is configured to enable removal of the valve stem from the valve body via release of the at least one internal retainer and inward movement of the valve stem along an internal path into the valve body while the valve remains disposed in the valve body, and the valve assembly has an axial path configured to enable installation and removal of the valve stem relative to the valve body only via axial movement along an axis of the stem bore and the axial path while the valve remains disposed in the valve body.

24. The system of claim 23, wherein the valve stem is removable through an opening different from the stem bore and a fluid passage through valve body.

25. The system of claim 23, wherein the valve stem is disposed in a first bore in a first side of the valve body, and the valve stem is removable at least in an inward direction through the first bore into the valve body after the at least one internal retainer is internally accessed inside the valve assembly to release the valve stem while the valve remains disposed in the valve body.

26. A method, comprising:
internally retaining a valve stem coupled to a valve in a fluid chamber within a valve body of a valve assembly with at least one removable retainer within the valve body; and
enabling removal of the valve stem from the valve body via release of the at least one removable retainer and movement of the valve stem along an internal path through the valve body while the valve remains disposed in the valve body, wherein the internal path of removal of the valve stem comprises an inward direction through a stem bore in a first side of the valve body toward the fluid chamber followed by an outward direction through the stem bore in a second side of the valve body.

27. The method of claim 26, wherein internally retaining comprises internally retaining the valve stem within the valve body with the at least one removable retainer and first and second protrusions extending away from an axis of the valve stem, wherein the at least one removable retainer is disposed between an outer surface of the valve stem and an inner surface of the valve assembly to block inward movement of the valve stem, the first protrusion blocks axial movement of the valve stem relative to a first internal shoulder in the valve body, the second protrusion blocks axial movement of the valve stem relative to a second internal shoulder in the valve, wherein internally retaining comprises preventing removal of the valve stem in an outward radial direction from a first bore in a first side of the valve body, wherein the valve stem is disposed in the first bore.

28. The method of claim 27, wherein the first protrusion blocks axial movement of the valve stem in an outward radial direction relative to the first internal shoulder in the valve body, and the second protrusion blocks axial movement of the valve stem in the same outward radial direction relative to the second internal shoulder in the valve.

29. The method of claim 27, wherein the first protrusion extends away from the axis of the valve stem to a first radius, the second protrusion extends away from the axis of the valve stem to a second radius, and the first and second radii are different from one another.

30. The method of claim 29, wherein the first radius is less than the second radius.

31. The method of claim 27, wherein the first protrusion comprises a first axial abutment facing outwardly away from a valve chamber in the valve body, the second protrusion comprises a second axial abutment facing outwardly away from the valve chamber in the valve body, and the valve is disposed in the valve chamber.

32. The method of claim 26, wherein the valve assembly has an axial path configured to enable installation and removal of the valve stem relative to the valve body only via axial movement along an axis of the stem bore and the axial path while the valve remains disposed in the valve body.

* * * * *